US007014101B1

(12) United States Patent
Kennedy

(10) Patent No.: US 7,014,101 B1
(45) Date of Patent: Mar. 21, 2006

(54) SYSTEM AND METHOD FOR RETRIEVAL OF ANCESTRAL INFORMATION

(76) Inventor: Joseph L. Kennedy, 228 S. Harbor Dr., Holmes Beach, FL (US) 34217

( * ) Notice: Subject to any disclaimer, the term of this patent is extended or adjusted under 35 U.S.C. 154(b) by 0 days.

(21) Appl. No.: 10/795,859

(22) Filed: Mar. 8, 2004

Related U.S. Application Data

(63) Continuation of application No. 10/055,484, filed on Jan. 22, 2002, now abandoned.

(51) Int. Cl.
*G06F 17/00* (2006.01)

(52) U.S. Cl. ....................................... 235/375; 235/487

(58) Field of Classification Search ................ 235/375, 235/380, 487; 40/124.5; 52/103, 104; 428/13
See application file for complete search history.

(56) References Cited

U.S. PATENT DOCUMENTS

| | | | | |
|---|---|---|---|---|
| 5,595,029 | A | 1/1997 | Revoir et al. | |
| 5,696,488 | A | 12/1997 | Assisi | |
| 5,732,515 | A | 3/1998 | Rodrigues | |
| 5,987,720 | A | 11/1999 | Yamamoto | |
| 6,264,032 | B1 | 7/2001 | Hobbs | |
| 6,340,978 | B1 | 1/2002 | Mindrum | |
| 6,385,499 | B1 | 5/2002 | Mattke | |
| 6,414,663 | B1 | 7/2002 | Manross | |
| 6,467,222 | B1 * | 10/2002 | Barnes | 52/103 |
| 6,571,439 | B1 | 6/2003 | Sens | |
| 6,760,731 | B1 * | 7/2004 | Huff | 707/101 |
| 2002/0039113 | A1 * | 4/2002 | Kawahara | 345/706 |

* cited by examiner

*Primary Examiner*—Ahshik Kim
(74) *Attorney, Agent, or Firm*—Charles J. Prescott

(57) ABSTRACT

An internet-facilitated system and method for retrieval of ancestral information relating to a deceased person. A medallion is permanently attached to a gravestone at the gravesite of the deceased person. The medallion bears viewable indicia including an identification number (I.D.) facing outwardly when the medallion is permanently attached to the gravestone. The I.D. is assigned is unique to the deceased person. A host computer database is configured to include ancestral information related to the deceased person retrievable via the Internet from a remote personal computer (P.C.) terminal. The information typically includes known ancestors, descendents, family history genetic/DNA profiles and exact geographic location of the gravesites of each of the deceased persons subscribed to the system according to each particular I.D. whereby individuals interested in obtaining the ancestral information with respect to a particular decedent, once knowing the particular I.D. on the medallion affixed to the gravestone, may do so by accessing the database via the internet from the remote P.C. and referencing the particular I.D.

2 Claims, 2 Drawing Sheets

SYSTEM AND METHOD FOR RETRIEVAL OF ANCESTRAL INFORMATION

BACKGROUND OF THE INVENTION

1. Scope of Invention

This invention relates generally to the storage and retrieval of ancestral and genealogical information with respect to a deceased person, and more particularly to a unique or individually coded identification (I.D.) on a medallion which is permanently affixed to the gravestone at the gravesite of the deceased person, the I.D. used to gain access to a host computer database via the Internet (W.W.W.) to obtain the deceased person's ancestral history.

2. Prior Art

Considerable interest has been generated in ancestral information of deceased persons. Obviously, this interest resides in those who have increasingly become interested in their family tree and other ancestral information. This interest in ancestral information more broadly extends beyond the family tree involved in that information. A great interest has arisen in generally seeking such ancestral information as it relates to geographical areas, particular family names, particular gravesites, time eras and the like.

One prior art retrieval system is disclosed by Assisi in U.S. Pat. No. 5,696,488. This invention teaches the utilization of an electronic transmitter attached to the gravestone at the gravesite which receives stored information by wireless radio means which is then transmitted to a separate communication apparatus held by the person desiring the ancestral information.

U.S. Pat. No. 6,264,032 issued to Hobbs is directed to a family finder which includes a container attached to a headstone or gravestone of an ancestor which enables the finding of distant relatives by the leaving of messages in the container which are then found by other distant relatives who may visit the headstone at the gravesite of the ancestor of interest.

Revoir, in U.S. Pat. No. 5,595,029 teaches a molded tombstone monument having unique material configurations, but not including means for obtaining or storing ancestral information related to the decedent at the gravesite. In U.S. Pat. No. 5,553,426, Ostergaard teaches a waterproof gravesite accessible-storage system having a lockable lid. Krawczyk in U.S. Pat. No. 6,199,327 also teaches a memorial plaque with a removable marker block. A tombstone picture display is taught by Becker in U.S. Pat. No. 6,105,288.

The present invention provides a means for obtaining ancestral information related to a deceased person at their gravesite by the attachment of a uniquely coded or specially numbered medallion permanently attached to the gravestone or tombstone, columbarium or mausoleum of the decedent. By observing and recording the identification number (I.D.), a visitor to the tombstone may then, through the use of a personal computer which has access to the internet, gain access to a host computerized storage system having a stored database of ancestral information for each of the registered deceased persons which have been entered into the host computer and referenced and accessible by the particular I.D. on the medallion. In a broader sense, the mere observable presence of the medallion on a gravestone advises that ancestral and genealogical information have been registered into the computer database of the system and is readily accessible via the Internet.

Many gravestones are made of soft or easily damaged marble, granite, stone or concrete and many have become illegible and unidentifiable over time due to weather, vandalism, acid rain, etc. Because no other records sometimes exist to re-establish identity or location of a particular grave, this grave then becomes an "unknown" grave. With the medallion affixed to a gravestone which becomes unreadable, their identity is still known with certainty. Likewise, if the medallion itself is lost or destroyed, the record would still exist to re-establish both gravestone and identity.

BRIEF SUMMARY OF THE INVENTION

This invention is directed to an internet-facilitated system and method for retrieval of ancestral information relating to a deceased person at their gravesite. After subscribing and providing all known or legally available ancestral information about the deceased person, a medallion is permanently attached to a gravestone at the gravesite or internment of the deceased person. The medallion bears viewable indicia including an identification number (I.D.) assigned to the deceased person which faces outwardly when the medallion is attached to the gravestone. The I.D., which is assigned is unique to each deceased person subscribing to the program. A host computer database is configured to include ancestral information retrievable via the Internet from a remote personal computer (P.C.) terminal. The information typically includes known ancestors, descendents, family history genetic/DNA profiles and exact geographic location of the gravesites and the like for of each of the deceased persons according to the I.D. Individuals interested in obtaining the ancestral information with respect to a particular decedent from the I.D. on the medallion affixed to a gravestone may do so by accessing the database via the Internet from the remote P.C.

It is therefore an object of this invention to provide a system and method for providing ancestral information about a deceased person from a uniquely coded identification number (I.D.) affixed to the gravestone of the deceased person.

It is another object of this invention to provide access to a pre-established host computer database containing ancestral information about deceased persons enrolled in the program.

It is still another object of this invention to provide access via the Internet and a personal computer (P.C.) to ancestral information related to a particular deceased person whose ancestral information has been pre-established on a host computer database.

Yet another object of the invention is to provide a means for instant visual notice to visitors of a gravesite or internment that the ancestral and genealogical history of the deceased person has been registered and stored in, and is accessible from, a host computer database.

Another object of the invention is to provide a redundant or back-up identification of a particular deceased person and their grave.

In accordance with these and other objects which will become apparent hereinafter, the instant invention will now be described with reference to the accompanying drawings.

DETAILED DESCRIPTION OF THE INVENTION

Figure 1:
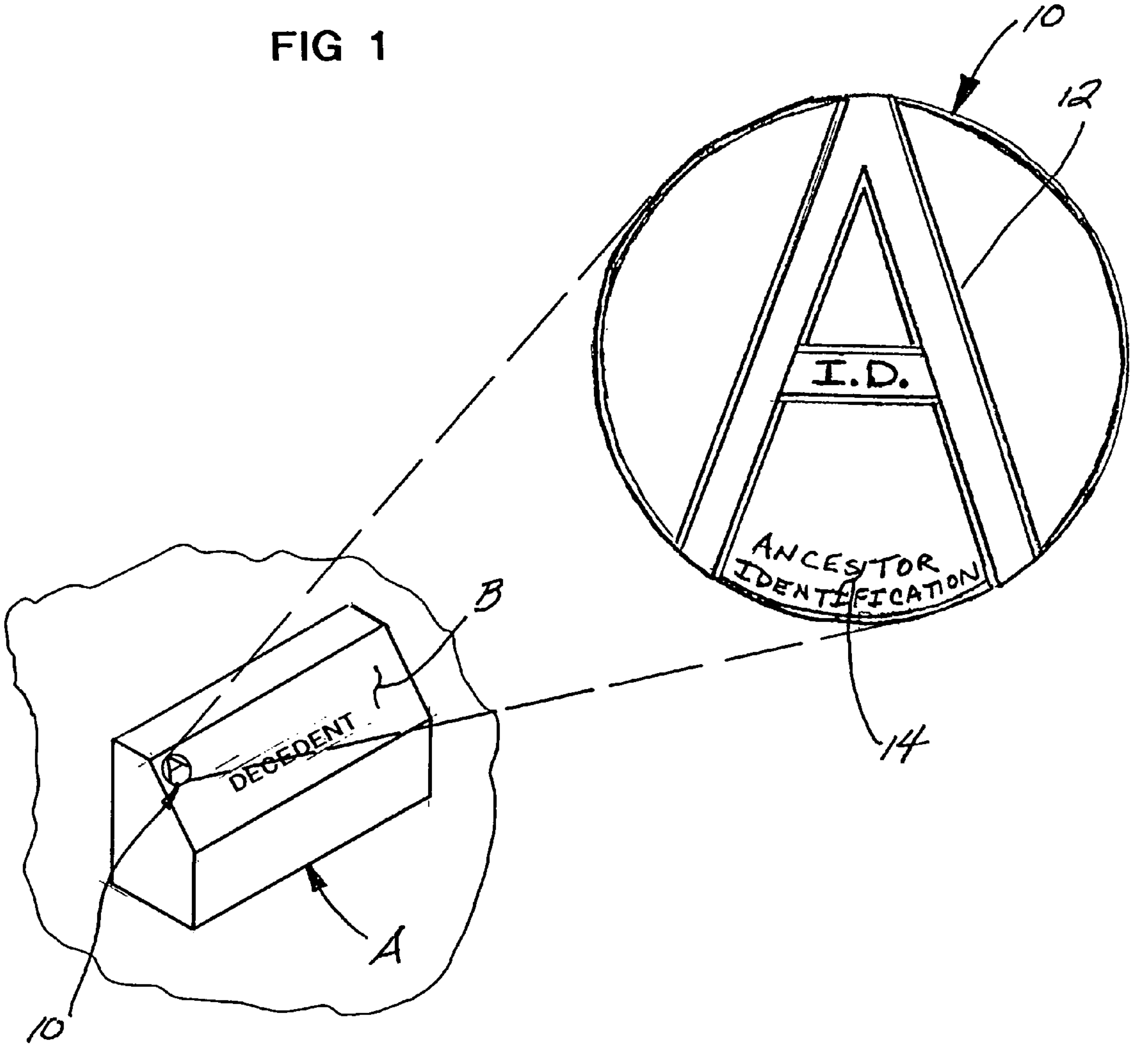
FIG. 1 is a perspective view of the preferred embodiment one aspect of the invention showing the medallion projected in enlarged form.

Referring now to the drawings, one aspect of the invention is shown generally in FIG. 1 in the form of an identification medallion or emblem 10 formed of any suitable weatherproof, durable material such as bronze, stainless steel, titanium, precious metal, ceramic, granite and other such materials suitable for this purpose. The medallion 10 bears indicia 12 which includes a registered identification 14 formed of a specific and unique combination of letters, numbers and/or symbols which is coded and registered for the deceased person at the gravesite marked by a tombstone or gravestone A. Typically, the decedent's name is engraved on the prominent, outwardly facing face B. Note that this system is equally applicable to the attachment of the medallion onto a columbarium, at a mausoleum or other identified and unmarked gravesites.

Either at burial or interment or thereafter, after subscription into the program, the medallion 10 may be affixed in a viewable position on the gravestone A as shown typically in FIG. 1. A visitor to the gravesite need only copy the I.D. 14 in order to then proceed to access pre-established ancestral information which is stored in a host computer database 22 in FIG. 2 which has been configured for the entering and storage of such ancestral information for each deceased person. This is typically done by someone such as a family member desiring to enter the retrievable ancestral information of the deceased person into the host computer database.

Figure 2:
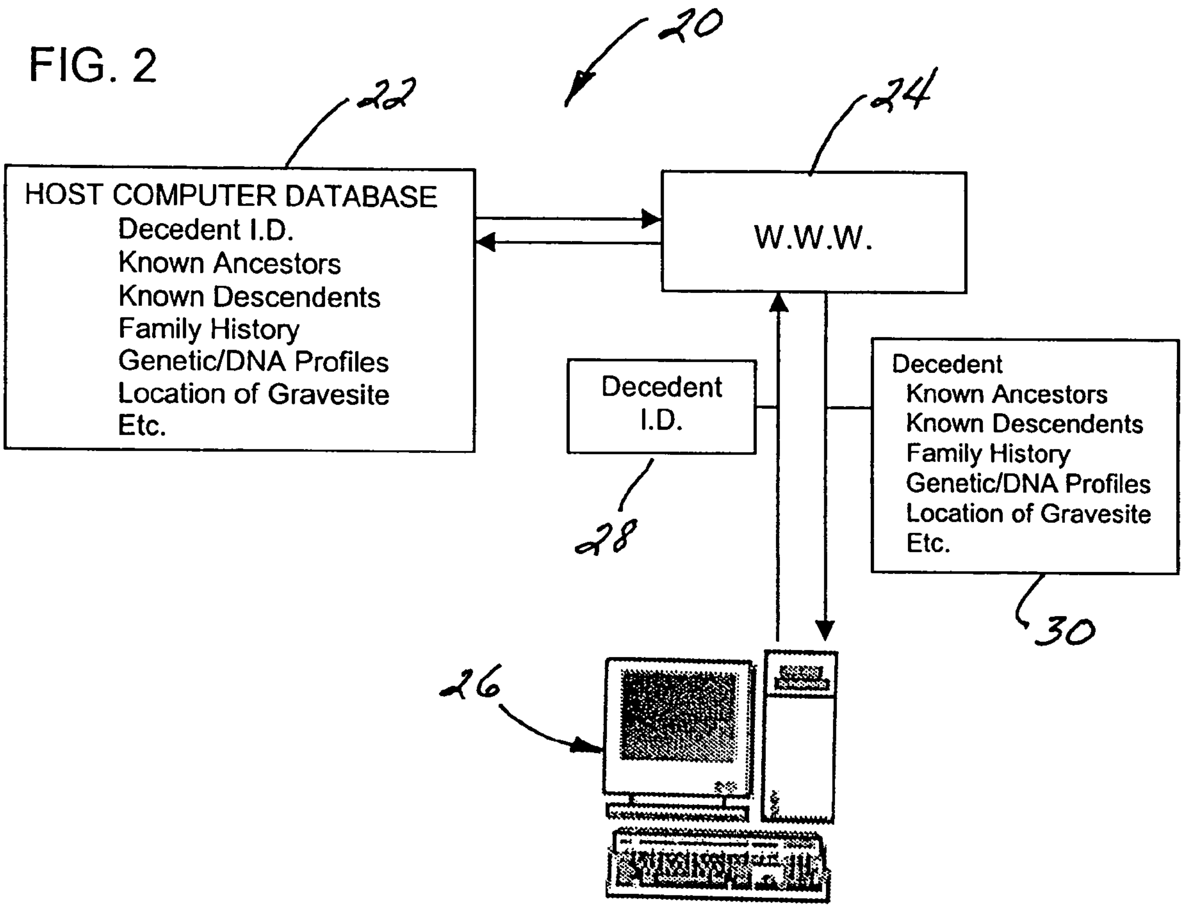
FIG. 2 is a schematic flow diagram of the invention.

As seen in FIG. 2, the host computer database 22 is programmed for each deceased person subscribed and entered into the system 20 to include such ancestral information as the decedent I.D., known ancestors, known descendants, family history, generic/DNA profiles, location of the gravesite in exact geographic terms as determined most accurately by global positioning system (GPS) equipment, size, shape, material and orientation of gravestone and other ancestral information of interest that is available for each of the deceased persons of the system 20.

A subsequent user of the system 20 wishing to retrieve the ancestral information stored in the host computer database 22 simply need only gain access by a personal computer 26 to the worldwide web (W.W.W.) 24. Then at 28, by entering the particular I.D. 14 from the gravestone A as shown in FIG. 1, the stored ancestral information for that particular deceased person will be transmitted from the host computer database 22 through the W.W.W. 24 back at 30 to the personal computer 26.

In commercial use, a family member or a close friend or acquaintance of the deceased person or genealogical and/or historical societies would facilitate the addition of ancestral information to the host computer database by subscribing on behalf of the deceased person or family and providing the ancestral information available for the deceased person. In conjunction with the entry and storage of this ancestral information, an I.D. 14 would be assigned uniquely to that particular deceased person and it would be engraved or permanently entered into the outwardly facing surface of the medallion 10 as shown in FIG. 1. The subscriber would then receive the inscribed medallion 10 and affix it to the gravestone A of the deceased person. Thereafter, anyone interested in the ancestral information for the deceased person named on surface B of the headstone need only then complete the process of recording the I.D. and then entering it into the website of the host computer database 22 as previously described.

The preferred embodiment of the medallion 10 is preferably in the form of a domed, circular bronze survey-type marker currently available in 2" and 4" diameters for economy. Such medallions may be affixed to the gravestone in a fashion similar to that utilized by a surveyor in affixing the medallion to rock, concrete, granite, etc. with epoxy or by mechanical fastening means. By preferably including a distinctive trademark design as shown at 12 in FIG. 1, the medallion 10 also provides an instant visual recognition that the ancestral and genealogical information of the deceased person is readily available and has previously been registered into the system and accessible by remote personal computer means.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. An internet-facilitated system for retrieval of ancestral information relating to a gravesite of a deceased person comprising:

a medallion adapted for permanent attachment to a gravestone at the gravesite of the deceased person;

said medallion bearing viewable indicia including an identification (I.D.) facing outwardly when said medallion is attached to the gravestone, said I.D. being unique to the deceased person;

a host computer database configured to include ancestral information retrievable via the internet from a remote personal computer (P.C.) terminal by reference to said I.D., said ancestral information including known ancestors, descendents, family history genetic/DNA profiles and exact geographic location of the gravesites of each of a plurality of deceased persons whereby individuals interested in obtaining the ancestral information with respect to a particular decedent knowing said I.D. on said medallion affixed to the gravestone may do so by accessing said database via the internet from the remote P.C. and referencing said I.D.

2. An internet-facilitated method for retrieval of ancestral information relating to a gravesite of a deceased person comprising the steps of:

A. assigning a unique identification (I.D.) to a deceased person;

B. programming a host computer database configured to include ancestral information retrievable via the internet from a remote personal computer (P.C.) terminal by reference to said I.D., the ancestral information including known ancestors, descendents, family history genetic/DNA profiles and exact geographic location of the gravesites of each of a plurality of deceased persons whereby individuals interested in obtaining the ancestral information with respect to a particular decedent may do so by accessing said database via the internet from the remote P.C. and referencing said I.D.

C. permanently attaching a medallion to the gravestone at the gravesite of the deceased person, said medallion bearing viewable indicia, including the I.D. of the deceased person.

* * * * *